Oct. 18, 1932.  E. L. BEECHER  1,883,488
SHOCK ABSORBER
Filed Jan. 22, 1930  3 Sheets-Sheet 1

Inventor
Eugene L. Beecher,
By Hull, Brock & West,
Attorneys

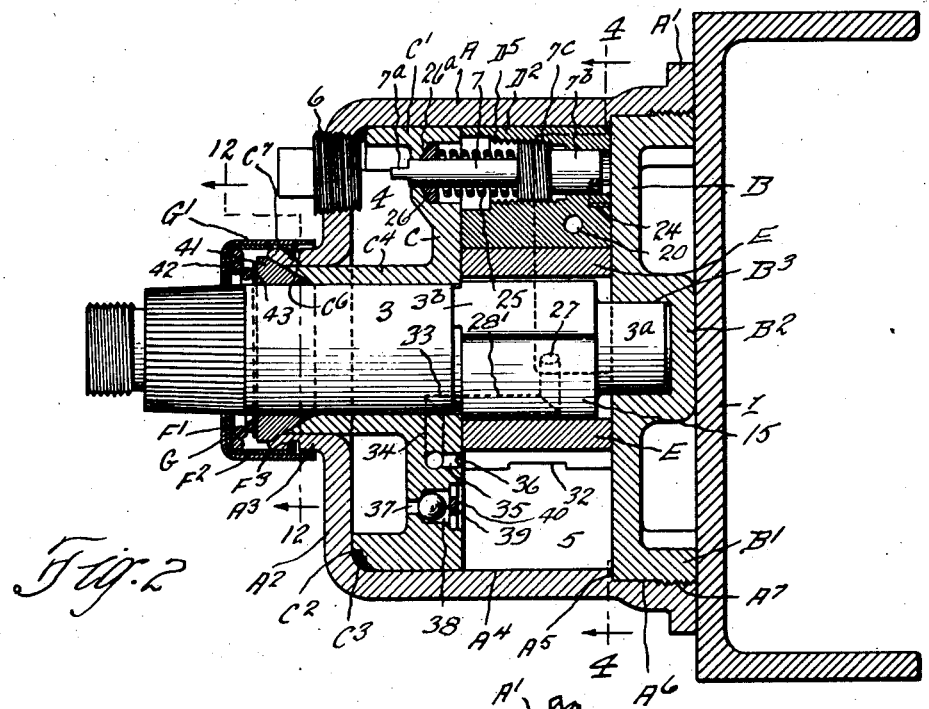

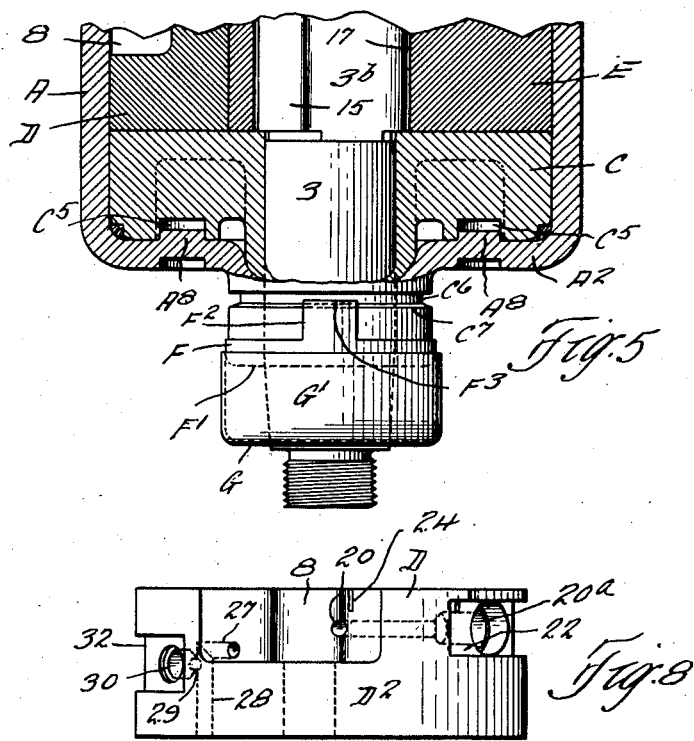
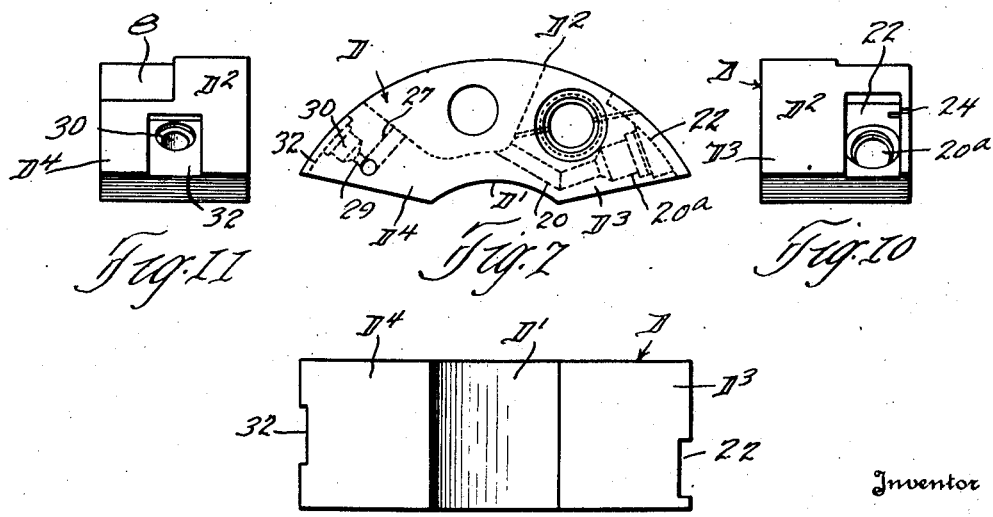

Patented Oct. 18, 1932

1,883,488

UNITED STATES PATENT OFFICE

EUGENE L. BEECHER, OF EAST CLEVELAND, OHIO, ASSIGNOR TO THE GABRIEL COMPANY, OF CLEVELAND, OHIO, A CORPORATION OF OHIO

SHOCK ABSORBER

Application filed January 22, 1930. Serial No. 422,519.

This invention relates to shock absorbers and more particularly to shock absorbers of the type wherein a vane or movable partition is connected with a shaft whereby, on rotation of the shaft in opposite directions, it is moved in a liquid-containing working chamber toward and from opposed partitions or opposite portions of a partition, with means for by-passing the liquid from one side of the movable vane or partition to the other. The general object of the invention is to improve and simplify the construction and operation of shock absorbers of this type. Further and more limited objects of the invention are to provide, for such shock absorbers, a novel manner of mounting the movable partition or vane upon the shaft, thereby to prevent leakage around the hub thereof and between such hub portion and the fixed partition; to provide means whereby resistance to the movement of the said vane toward the fixed partition may be gradually and automatically increased as the vane approaches said partition and particularly as to the movement of the vane due to impact; to provide a simple and novel packing arrangement for the stuffing box surrounding the shaft; to provide, in such shock absorbers, means for automatically compensating for variations in viscosity in the liquid in the working chamber, due to variations in temperature; also to control the passage of liquid from one side to the other of the vane or movable partition in such manner as to enable the check valve to operate slowly and noiselessly thereby to reduce the wear thereon and eliminate noise incident to seating thereof and the transmission of such noise to the vehicle chassis.

Figure 1:
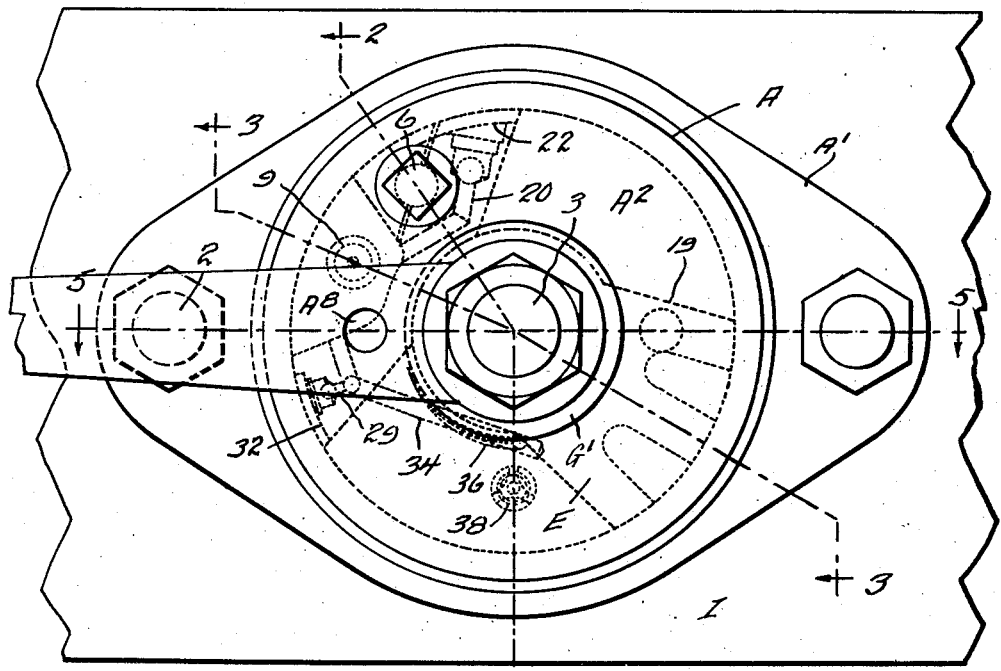
Figure 4:
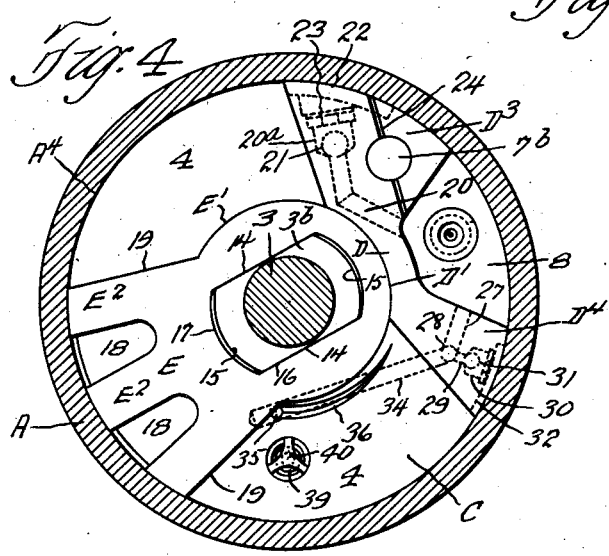
Figure 12:
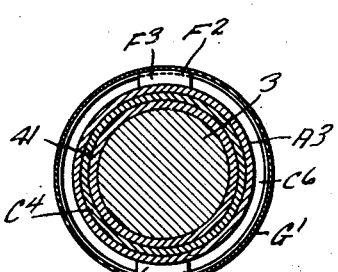
Figure 6:

Other and more limited objects of the invention will appear hereinafter and will be realized in and through the construction and arrangement of parts shown in the drawings, wherein Fig. 1 represents a front elevation of a shock absorber constructed in accordance with my invention showing the same applied to one of the side members of an automobile; Figs. 2 and 3 are details in section corresponding respectively to the lines 2—2 and 3—3 of Fig. 1; Fig. 4 a detail in section corresponding to the line 4—4 of Fig. 2; Fig. 5 a fragmentary sectional detail taken on the line 5—5 of Fig. 1, the retaining cap for the packing spring clamp being partially removed from such clamp; Fig. 6 a detail in section of a portion of the cover block for the working chamber; Fig. 7 a front elevation, Figs. 8 and 9 side elevations, and Figs. 10 and 11 opposite end elevations of the fixed partition; and Fig. 12 a detail in section corresponding to the line 12—12 of Fig. 2.

Describing the various parts by reference characters, 1 denotes one of the side members of an automobile on which my shock absorber is mounted. For convenience of description, the forwardly facing portion of the shock absorber as shown in Fig. 2 will be referred to as the "front" and the portion secured to the side member as the "rear" of such shock absorber, but without any intention thereby of limiting the position of the shock absorber in use.

The shock absorber comprises an outer casing A having a rear base flange A' by means of which it is secured to the side member 1 by means of bolts 2. The casing A has formed therewith a front cover $A^2$ having a central cylindrical neck $A^3$. The rear end of the casing is open and has a cylindrical inner wall $A^4$ extending from a point adjacent to the cover toward the rear end thereof, where an annular shoulder $A^5$ is provided from which a short cylindrical chamber $A^6$ extends, the rear end of the chamber being provided with an internal thread $A^7$.

Mounted in the rear of the casing A is the bottom closure B, said closure being provided with a cylindrical side flange B' which fits snugly within the chamber wall $A^6$ and which is threaded into the bottom of said chamber, the said closure being provided with a central boss $B^2$ having a cylindrical bearing $B^3$ therein for the rear or inner end $3^a$ of the shaft 3.

Before inserting the bottom closure in place, a cover block is inserted into the upper or front portion of the casing. This block, indicated generally at C, is provided with a cylindrical side wall C' fitting closely within the inner cylindrical wall $A^4$ of the casing.

At its upper end, the side wall C' is provided with an angular peripheral groove C² extending therearound, the said groove being filled with soft lead or other suitable compressible packing material C³. The cover block is provided also with a neck C⁴ which fits closely about the shaft 3 and extends into and fits snugly within the neck A³ of the casing C. The front face of the cover block is recessed, as shown at 4, to provide, with the cover portion A² of the casing A, a reserve chamber for liquid to be supplied to the working chamber 5, which working chamber is provided between the cover block C and the end closure B. For the purpose of replenishing the chamber 4 from time to time, the casing cover is provided with a plug 6 through which liquid may be introduced from time to time. This plug is arranged in alinement with the tool-receiving end 7ᵃ of a valve stem 7, the valve stem and the valve connected thereto being mounted in the cover block and in the fixed partition (to be described hereinafter).

Extending across one side of the working chamber is a fixed segmental partition, indicated generally at D. This partition consists of a metal block having a chamber 8 extending thereinto from its rear face. The partition is interposed between the shaft 3 and the inner wall of the casing C and is provided with a cylindrical inner surface D' extending the full depth thereof and facing the shaft 3, also with a cylindrical outer surface D² adapted to engage the inner wall of the casing A, both of said surfaces being concentric with the axis of rotation of said shaft. The partition is anchored in place in any suitable manner, as by means of a tubular dowel 9 having one end anchored in a suitable cylindrical seat 10 in the cover block C and its opposite end mounted in a chambered seat 11 in said partition. The tubular dowel 9 serves as a means for relieving the working chamber of air that may accumulate therein, but without the egress of liquid therefrom, this result being accomplished by mounting in the front or delivery end of the said dowel a plug 12 having a central bore 12ᵃ communicating with the bore of the dowel and provided at its rear end with a capillary passage 13 communicating with the bore 12ᵃ and with the upper portion of the chamber 4. The opening 13 will permit the escape of air from the working chamber into the upper portion of the compensating chamber, while preventing the passage of liquid therethrough.

The cover block C in turn is anchored in place within the casing A by means of integral dowels A⁸ pressed from the front or cover portion of the casing and projecting into dowel seats C⁵ formed in the front of the cover block—see Fig. 5.

The shaft 3 is provided, within the working chamber 5, with a seat block 3ᵇ on which the vane is mounted for limited sliding movement. This movement is accommodated by forming the seat with parallel sides 14 and cylindrical ends 15, the end surfaces 15 being concentric with the axis of the shaft; and the portion of said seat which extends from the shaft toward the partition D is shorter than the portion which extends toward the blade of the vane E.

The vane or movable partition, indicated generally at E, is provided at its inner end with a cylindrical hub portion E' adapted to engage the cylindrical surface D and to conform thereto in all positions of the vane, as the latter is rotated by the shaft 3. The vane is mounted upon the seat 3ᵇ by means of a slot of slightly greater length than the seat and having parallel sides 16 adapted to slidably engage the sides 14 of the seat and having cylindrical ends 17 concentric with the cylindrical surfaces 15 on said seat. At its outer end, the blade portion of the vane is provided with a plurality of inwardly extending pockets 18. The provision of these pockets sets up a whirling action in the liquid contained therein, under quick or sudden movements of the vane, and thus tends to maintain a liquid seal between the cylindrical ends of the fingers or projections E² of said vane and the interior of the casing under such conditions, thereby avoiding the necessity for providing specially close tolerances between the casing and the vane fingers or extensions.

Due to the whirling action of the liquid contained in the pockets and the consequent tendency to maintain a liquid seal between the cylindrical ends of the fingers or projections E² of the vane and the cylindrical inner wall of the casing, there is a tendency for the vane to be moved bodily toward the partition D. Furthermore, as the vane moves toward either partition branch the liquid is directed away from the bearing surface D' by the inclination of the sides of the vane. This assists in preventing leakage between the hub E' of the vane and the concave surface D' of the partition.

Furthermore, in order to compensate for variations in viscosity of the liquid in the working chamber, due to variations in temperature, I construct the vane and the partition of a metal having a higher coefficient of expansion than the casing, so that, in operating at low temperatures, the clearance between the ends of the fingers or projections E² and the inner wall of the casing will be increased over the clearance at normal temperatures and so that, when operating at higher temperatures, the clearance will be decreased as compared with the clearance provided for at normal temperatures. Metals which I have employed successfully for this purpose are iron or steel for the casing A and zinc alloy for the vane and partition D.

It will be noted that the partition D is provided in one branch D³ thereof with a passage 20 communicating at one end with the chamber 8 and at its other end with a chamber 20ª containing a check valve 21, the parts being so arranged that, when the check valve is opened, a free passage is provided from the chamber 8 to the working chamber 4 on one side of the partition through the passage 20 and the chamber 20ª and a wide passage 22 in the outer surface $D^2$ of the partition. It should be noted further that the wide passage 22 extends from the working chamber 4 across the mouth 23 of the chamber in which the ball check valve is mounted and across a slotted port 24 which is controlled by the cylindrical valve body $7^b$ operated by the stem 7, the valve being adjustably mounted in the branch $D^3$ by means of a threaded projection $7^c$ on the valve engaging the thread in a chamber $D^5$ in said branch. A spring 25 surrounds the valve stem and bears at one end against the threaded projection $7^c$ of the valve and at its opposite end against a packing 26 fitted in a tapered seat $26^a$ in the cover block and through which seat the valve stem projection $7^a$ extends. By this construction, the valve is prevented from opening and the packing is compacted about the valve stem.

It will be noted that the opposite leg or branch $D^4$ of the partition is provided with a port 27 communicating at one end with the chamber 8 and extending from said chamber into the body of said branch where it communicates with the passage 28 which extends forwardly through the front wall of said branch (see Figs. 2, 4 and 8). Extending from the port 28 is a short port 29 leading to a chamber 30 having a ball check valve 31 therein, said chamber communicating with a wide passage 32 formed in the outer cylindrical surface $D^2$ of the branch $D^4$, said passage communicating at one end with the working chamber 4 and having its other end extending beyond the chamber 30.

The forward end of the port 28 communicates with a short forwardly extending passage 33 in the cover block C, which passage in turn communicates with a laterally extending passage 34 in said block, and the passage 34 communicates in turn with the rearwardly extending port 35, the rear end of which port communicates with a V-shaped groove 36 formed in the rear face of said cover plate, the said groove being substantially concentric with the axis of rotation of the shaft 3 and gradually diminishing in depth and width toward but terminating short of the branch $D^4$ of the partition—see Fig. 6, which shows a sectional view through the portion of the cover block containing said groove, the view being taken along the central or deepest part of the said groove.

For the purpose of replenishing the working chamber 5, the cover block C is provided in the lower portion thereof with a port 37 communicating at its front end with the reserve chamber and opening into a valve chamber 38 provided with a ball check 39, which is retained in place by a cage 40. When a slight suction is produced in the chamber 4 by the vane E, liquid will be drawn through the passage 37 and chamber 38 into the working chamber, thereby to replenish any loss of liquid in such chamber.

Reference has been made hereinbefore to the manner of packing the shaft 3, to prevent leakage of operating liquid therearound. I accomplish this by beveling outwardly the ends of the necks $C^4$ and $A^3$ so that they jointly form a substantially continuous frusto-conical seat converging toward the shaft in which seat is placed a frusto-conical packing ring 41. This packing ring is maintained under compression by a spring 42 which is interposed between an annular flange $F'$ of a clamping member F and a washer 43 on the outer surface of the packing ring. The clamping member is detachably secured in place upon the neck $A^3$ in the following manner:—Said neck is provided with a groove $C^6$ extending therearound, the front wall of said groove being forwardly and outwardly beveled, as shown at $C^7$. The clamping member F is provided with a pair of integrally opposed spring arms $F^2$ each having an inwardly projecting finger $F^3$ at its rear end whereby, when the spring 43 shall have been compressed to the desired extent by moving the clamping device rearwardly, the fingers will snap into place within the groove $C^6$. However, owing to the outward and forward bevel of the wall $C^7$ of said groove and the pressure exerted upon the clamping device by the spring 43, the clamping device will not remain in place. In order to retain it in place, I employ therewith a retainer comprising a cap having a cover G provided with an opening whereby it may be applied to the shaft 3 and a skirt $G'$ which receives the spring arms $F^2$ therewithin and is of such diameter as to hold the fingers $F^3$ in the position shown in Fig. 2—with the fingers seated in the groove $C^6$. When it is desired to remove the packing ring or to have access to the joint, it is necessary only to move the cap G, $G'$ forwardly along the shaft 3 until the skirt of the cap shall have disengaged the spring clips whereupon the fingers $F^3$ will be forced out of the groove $A^6$, exposing the joint and the packing for inspection.

It will be noted that the casing A, together with the cover $A^2$ and the neck $A^3$, is made from a single piece of material, preferably by a stamping operation, the cover $A^2$ having the dowel projections $A^8$ pressed therefrom. This manner of making the casing, when taken with the cooperating construction of the various parts which enter into the construction of my shock absorber enable me to produce a shock absorber of marked efficiency and at a low cost of production.

In operation, the parts are so arranged that, on impact (when the body and axle of the vehicle approach each other) the vane E will move toward the branch D⁴ of the partition D, closing the check valve 31. As the vane moves in this direction, the comparatively free by-passing of the liquid to the opposite side of the vane will be afforded through the groove 36, the conduit constituted by the passages 35, 34, 33, 28 and 27 into the chamber 8 and thence through the conduit produced by the passage 20, chamber 23, and passage 22. However, as the vane approaches more nearly the branch D⁴ of the partition, it will increasingly cover the groove 36, thereby progressively decreasing its cross-sectional area and to a corresponding extent throttling the flow of liquid to the opposite side of the vane. It will be noted that the narrow end of the groove terminates short of the partition branch D⁴. In this position, there will be no by-passing of liquid to the opposite side of the vane, and the impact movement of the body and axle toward each other can thereby be checked before the body strikes the axle.

When the vane moves toward the opposite branch D³ of the partition, the liquid in the working chamber will be forced through the slotted passage 22 and through the narrow slotted port 24, the area of which is controlled by the valve body 7ᵇ. Liquid passing through the port 24 will be by-passed to the opposite side of the vane through the chamber 8 and the passages 27 and 29, chamber 30, and slotted passage 32. Reference has been made hereinbefore to the automatic compensation for variations in viscosity of the liquid by the metals employed in the vane and partition and in the casing. The use of metal having a relatively high coefficient of expansion for the partition causes an automatic variation, by temperature changes, of the width of the passage 24 thus compensating for variations in the viscosity of the liquid due to temperature conditions. Furthermore, the contraction and expansion of the vane and partition will not result in any binding or distortion of the shaft, this action being prevented by the manner of mounting the vane on the shaft.

It will be noted that both ball checks 21 and 31 are located in chambers extending substantially at right angles from their respective slotted passages 22 and 32 located in the outer cylindrical surface D² and that these passages extend beyond the said chambers. Because of this arrangement, the liquid is forced along the said passages in a direction approximately at right angles to the travel of the ball checks, thereby causing a slower seating movement of each of these checks, with a corresponding reduction in noise and wear.

It has been pointed out hereinbefore that the part of the seat 3ᵇ for the vane which extends toward the chambered end of said vane is somewhat longer than the opposite end. This secures a longer forward or driving radius for the operating portion of the vane than is provided for the opposite partition-facing portion thereof.

Having thus described my invention, what I claim is:

1. A shock absorber comprising in combination a cylindrical casing having an open bottom and provided with an integral cover having a central opening therethrough, a shaft mounted in said casing and extending through the said opening, a closure for the bottom of the said casing, a cover block spaced from the cover of the said casing and providing a working chamber between its rear face and the said closure, the said cover block having a central neck formed therewith and constituting a bearing for the shaft and extending into the central opening in the casing cover, a movable vane or partition mounted on said shaft in the working chamber, packing material for the end of the cover-block neck, and means secured to the cover of said casing for holding the said packing material under compression.

2. A shock absorber comprising in combination a cylindrical casing, a shaft journaled in said casing, a partition interposed between said shaft and the inner wall of said casing, the said partition having a cylindrical surface presented toward said shaft and concentric with the axis of rotation of said shaft, and a vane mounted on said shaft so as to have a sliding movement thereon toward and from the said partition, the said vane having a hub provided with a cylindrical surface, the cylindrical surface of such hub being concentric with the axis of rotation of said shaft and adapted to engage the corresponding cylindrical surface of the said partition.

3. A shock absorber comprising in combination a cylindrical casing, a shaft journaled in said casing, a partition interposed between said shaft and the inner wall of said casing, the said partition having a cylindrical surface presented toward said shaft and concentric with the axis of rotation of said shaft, and a vane mounted on said shaft so as to have a sliding movement thereon toward and from the said partition, the said vane having a hub provided with a cylindrical surface, the cylindrical surface of such hub being concentric with the axis of rotation of said shaft and adapted to engage the corresponding cylindrical surface of the said partition, the said vane and the said partition being made of a material having a coefficient of expanend of which port is adapted to deliver liquid passing therethrough to one of the last mentioned chambers, the said partition having a peripheral passage communicating at one end with the other of said last mentioned chambers and at its opposite end with the other end of said port, the said partition also having a conduit for permitting the flow of liquid in the reverse direction therethrough, the said conduit having a chamber at one end thereof arranged in proximity to the said peripheral passage and adapted to receive liquid therefrom, and a ball valve in the last mentioned chamber, the said chamber and ball valve being located between the receiving end of the said port and the chamber from which liquid is supplied to said port.

18. A shock absorber comprising in combination a cylindrical casing having a working chamber therein, a shaft journaled in said casing, a partition interposed between said shaft and the inner wall of said casing in said chamber, a vane mounted on said shaft and movable toward and from said partition and dividing the working chamber into two chambers formed between the opposite sides of the vane and the said partition, the said partition having a by-pass conduit therethrough, the said conduit comprising a passage formed in the peripheral portion of said partition and communicating at one end with one of said chambers, whereby on movement of the vane toward the receiving end of said passage liquid will be forced by said vane toward such passage end and away from the shaft on which the vane is mounted.

19. A shock absorber comprising in combination a cylindrical casing having a working chamber therein and a shaft mounted in said casing and having a vane in said working chamber, a partition in said chamber toward and from which the said vane is moved by said shaft, a cover block within the forward portion of said casing and constituting a cover for the working chamber, the said partition having a port therethrough for the passage of liquid through said partition, a valve adapted to close the said port more or less and threaded in said partition, the said valve having a projection and a valve stem projecting through the front of said partition and through the cover block, the said cover block having a chamber facing and forming a continuation of the bore in said partition and through which chamber the valve stem extends, packing material surrounding the valve stem in the cover block chamber, and a spring interposed between said packing and the projection on the valve.

20. A shock absorber comprising in combination a cylindrical casing having a working chamber therein and a shaft mounted in said casing and having a vane in said working chamber, a partition in said chamber toward and from which the said vane is moved by said shaft, a cover block within the forward portion of said casing and constituting a cover for the working chamber, the said partition having a port therethrough for the passage of liquid through said partition, a valve adapted to close the said port more or less and threaded in said partition, the said valve having a projection, and a valve stem projecting through the front of said partition and through the cover block, the said cover block having a chamber facing and forming a continuation of the bore in said partition, the said chamber having a tapered seat facing the said bore and surrounding a bore extending from said chamber through the cover block and through which chamber and into which bore the said valve stem extends, packing material surrounding the valve stem in the said seat, and a spring interposed between said packing and the projection on the valve.

21. A shock absorber comprising in combination a cylindrical casing having a working chamber therein and a shaft mounted in said casing and having a vane in said working chamber, a partition in said chamber toward and from which the said vane is moved by said shaft, a block within the forward portion of said casing and constituting a cover for the working chamber, the said partition having a port therethrough for the passage of liquid through said partition, a valve adapted to close the said port more or less and mounted in said partition, the said valve having a projection threaded into a portion of said partition, a valve stem projecting through the front of said partition and through the cover block, and a spring surrounding the valve stem and pressing at one end against the cover block and at its other end against the said projection.

22. A shock absorber comprising a cylindrical pressed metal casing having an integral cover, a shaft journaled in said casing, a closure for the rear end of said casing, a cover block interposed between said cover and the said closure and forming a working chamber with the latter, a vane in said working chamber, a partition in said working chamber, means for anchoring the partition to the cover block, and means for anchoring the cover block to the cover.

23. A shock absorber comprising a cylindrical pressed metal casing having an integral cover, a shaft journaled in said casing, a closure for the rear end of said casing, a cover block interposed between said cover and the said closure and forming a working chamber with the latter, a vane in said working chamber, a partition in said working chamber, means for anchoring the partition to the cover block, and means for anchoring the cover block to the casing cover, and said means comprising integral dowel projections on said cover entering seats provided therefor in said block.

24. A shock absorber comprising a cylindrical pressed metal casing having an integral cover member, a shaft journaled in said casing, a closure for the rear end of said casing, a cover block member interposed between said cover member and the said closure and forming a working chamber with the latter, a vane in said working chamber, a partition in said working chamber, and means for anchoring the cover block member to the casing cover member, the said means comprising dowel projections on one of said members entering seats provided therefor in the other member.

25. A shock absorber comprising in combination a cylindrical casing, a shaft journaled in said casing, a partition interposed between said shaft and the inner wall of said casing, the said partition having a cylindrical surface presented toward said shaft and concentric with the axis of rotation of said shaft, a seat on said shaft, the said seat having a projection normally extending toward said partition and a projection extending in the opposite direction and of greater length than the former projection, the said seat having parallel sides, and a vane having a slotted opening of greater length than said seat and having parallel sides adapted to slidably engage the sides of said seat, the said vane having a hub in the form of a segment of a cylinder, the cylindrical surface of said hub being concentric with the axis of rotation of said shaft and adapted to engage the corresponding cylindrical surface of the said partition.

26. A shock absorber comprising in combination a cylindrical casing, a shaft journaled in said casing, a partition interposed between said shaft and the inner wall of said casing, the said partition having a cylindrical surface presented toward said shaft and concentric with the axis of rotation of said shaft, a seat on said shaft, the said seat having a projection normally extending toward said partition and a projection extending in the opposite direction and of greater length than the former projection, the said seat having parallel sides, and a vane having a slotted opening of greater length than said seat and having parallel sides adapted to slidably engage the sides of said seat, the said vane having a hub in the form of a segment of a cylinder, the cylindrical surface of said hub being concentric with the axis of rotation of said shaft and adapted to engage the corresponding cylindrical surface of the said partition.

27. A shock absorber comprising in combination a cylindrical casing, a shaft journaled in said casing, a partition interposed between said shaft and the inner wall of said casing, the said partition having a bearing surface presented toward said shaft, and a vane mounted on said shaft so as to have a sliding movement thereon toward and from the said partition, the said vane having a bearing surface adapted to engage the bearing surface of the partition.

28. A shock absorber comprising in combination a cylindrical casing, a shaft journaled in said casing, a partition interposed between said shaft and the inner wall of said casing, the said partition having a cylindrical surface presented toward said shaft and concentric with the axis of rotation of said shaft, a vane mounted on said shaft so as to have a sliding movement thereon toward and from the said partition, the said vane having a hub provided with a cylindrical surface, the cylindrical surface of such hub geing concentric with the axis of rotation of said shaft and adapted to engage the corresponding cylindrical surface of the said partition, the said partition having a slotted port therethrough forming part of a by-pass for liquid from one side of the vane to the other, and a valve for varying the effective depth of said slot.

In testimony whereof, I hereunto affix my signature.

EUGENE L. BEECHER.

Oct. 18, 1932.                F. P. BEEDLE ET AL                1,883,489
                                  CULTIVATOR
                    Filed July 9, 1931          2 Sheets-Sheet 1
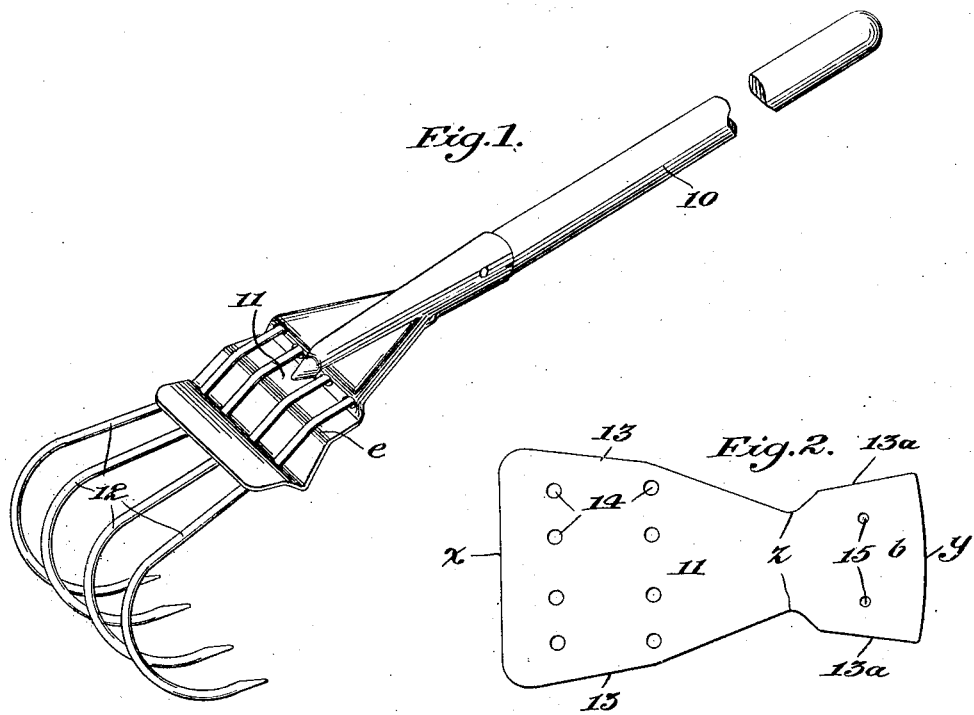
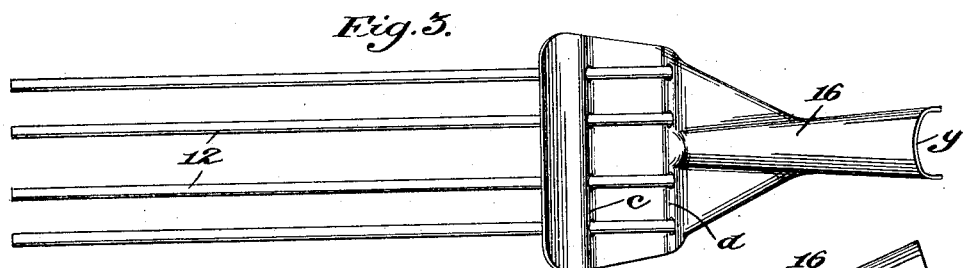
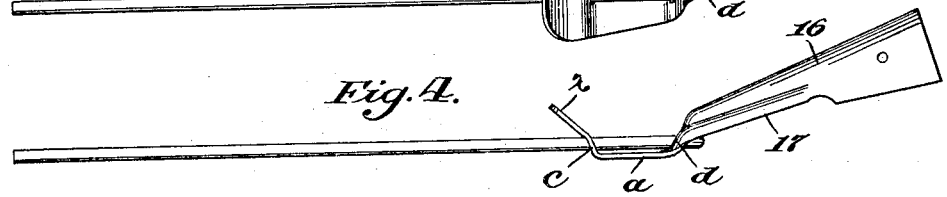
Inventors.
Fred P. Beedle
and Harry T. Kingsbury,
by Sturtevant Mason
                    Att'ys.